United States Patent [19]

Lewis et al.

[11] 3,893,399
[45] July 8, 1975

[54] DUAL CARGO ANCHORING DEVICE

[75] Inventors: Dean F. Lewis, Lafayette; Vearne D. Pinney, Hayward, both of Calif.

[73] Assignee: Cargotrol Corporation, Hayward, Calif.

[22] Filed: Sept. 5, 1974

[21] Appl. No.: 503,377

[52] U.S. Cl............... 105/484; 24/115 K; 24/131 R
[51] Int. Cl.²................... B61D 45/00; F16G 15/00
[58] Field of Search .......... 105/473, 475, 476, 477, 105/478, 479, 480, 481, 482, 483, 484, 485; 280/179 R, 179 A; 24/115 K, 131 R, 129 C, 265 AL, 265 CD, 265 CDT, 198

[56] References Cited
UNITED STATES PATENTS

| | | | |
|---|---|---|---|
| 384,130 | 6/1888 | Comstock | 24/131 R |
| 2,702,513 | 2/1955 | Tuttle | 105/480 |
| 3,412,693 | 11/1968 | Lewis | 105/484 |

*Primary Examiner*—M. Henson Wood, Jr.
*Assistant Examiner*—Gene A. Church
*Attorney, Agent, or Firm*—James R. Cypher

[57] ABSTRACT

A cargo anchoring device consisting of a load holding bent wire member in which the ends of the wire are formed in a diverging relationship and portions of the wire adjacent the ends are joined. The load holding member is pivotally attached to the frame of the cargo container by a bracket member.

5 Claims, 5 Drawing Figures

3,893,399

DUAL CARGO ANCHORING DEVICE

BACKGROUND OF THE INVENTION

It is essential to provide cargo tie down fittings for transportation equipment such as trucks, railroad cars, boats and airplanes to prevent the load from shifting while in transit. The present device relates particularly to wall mounted fittings but could be used in floors or ceilings. At the present time, several types of ring fittings are available in which the end of a rope, strap or cord is threaded through a load holding ring. See for example D. F. Lewis U.S. Pat. No. 3,412,693.

Other types of fittings provide a post so that it is not necessary to thread the cargo binding element but rather it is only necessary to place a loop of the strap or rope over the post. See A. C. Tuttle, U.S. Pat. No. 2,702,513 or Vierregger 3,334,914.

SUMMARY OF THE INVENTION

The gist of the present invention is the use of a single load holding member which serves both as a closed ring fitting for threadably receiving a cargo binding element and as an anchoring post for releasably receiving the loop end of a cargo binding element.

An object of the present invention is to provide an anchoring device which will more reliably retain the loop end of the cargo binding element such as a rope, cord or strap should the cargo shift and the binding element go slack.

Still another object is to provide an anchoring device which will reduce wear on the binding element.

A further object is to provide an anchoring device which will transfer the load on the cargo binding element directly to the frame of the cargo carrier with a minimum of bending stress on the elements of the anchor. A still further object is to provide a device as described which is inexpensive to manufacture, easy to install, durable and does not protrude into the cargo space when not in use and thus does not damage the cargo.

Another object is to provide a post anchoring device which will retain the loop end of the cargo binding device in any direction of the load about the point of attachement.

BRIEF DESCRIPTION OF THE PREFERRED EMBODIMENTS OF THE INVENTION

Figure 1:
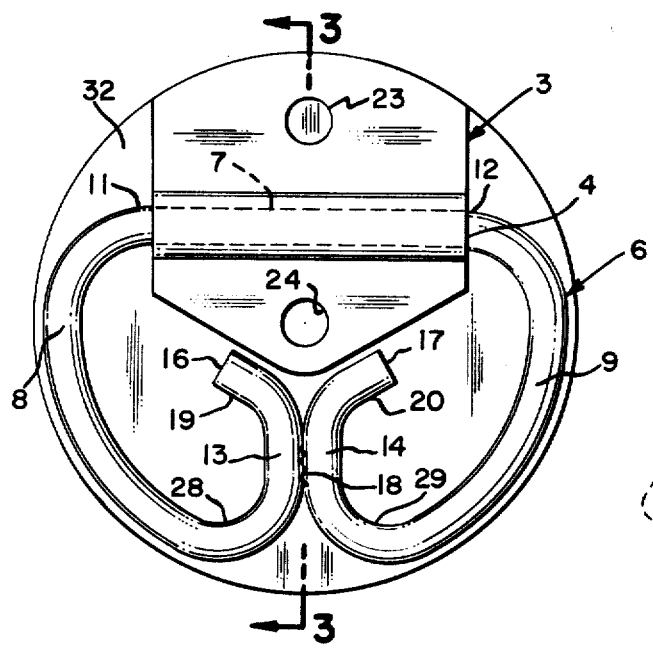
FIG. 1 is a front elevation view of the device of the present invention.
Figure 2:
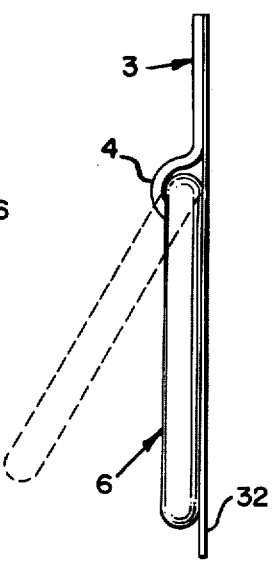
FIG. 2 is a side view of the device shown in FIG. 1.
Figure 3:
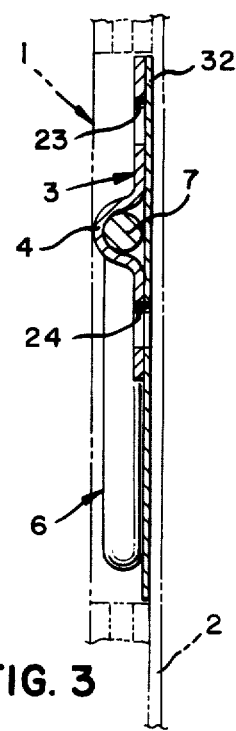
FIG. 3 is a cross section of the device taken along line 3—3 of FIG. 1.
Figure 4:
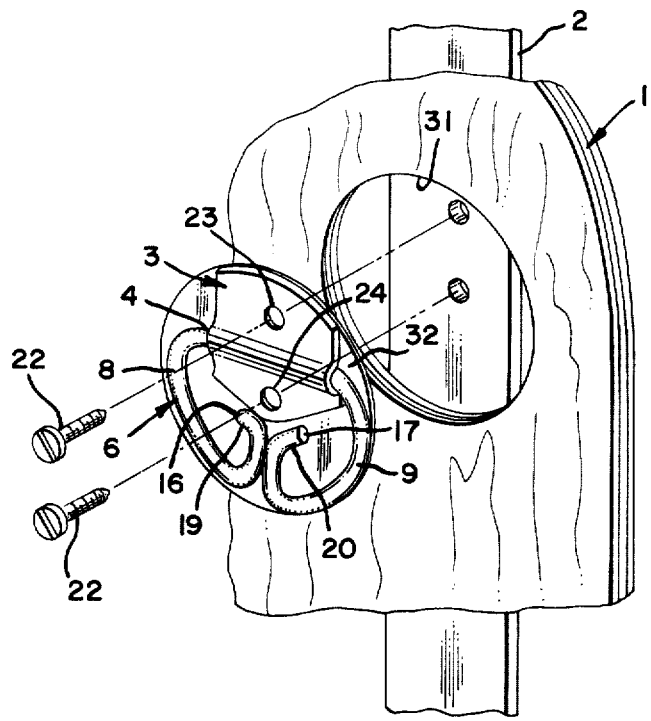
FIG. 4 is an exploded perspective view of the device showing the method of installation.

The dual cargo anchoring device of the present invention for a cargo vehicle having sidewalls 1 and frame members 2 consists briefly of, a hold-down clip 3 having an elongated U-shaped portion 4 and adapted for connection to the frame members of the vehicle;

a B-shaped tie down member 6 having: a straight portion 7 for pivotal support between the U-shaped portion of the clip and the frame member, first and second curved portions 8 and 9 integrally connected to opposite ends 11 and 12 of the straight portions and curving inwardly with the portions 13 and 14 adjacent the ends 16 and 17 being connected as by weld 18, first and second end portions 19 and 20 integrally connected to the first and second curved portions splaying away from each other; and means 22 for attaching the clip to the frame members.

The dual cargo ring may be mounted prior to installation of the sidewalls of the cargo vehicle, but preferably the device is mounted after installation of the walls. Since hole saws are commonly available for cutting circular openings in the side walls, the device is preferably designed and dimensioned for lying within a circle.

The hold-down clip 3 serves the dual purpose of attaching the tie down member to the structural supports 2 of the cargo vehicle and for permitting nearly 180 degree pivoting of the tie down member. Preferably the clip is constructed from at least a 14 gauge plated steel plate so that it will not deform under normal loading conditions with the usual safety factors. Since load will be applied in every direction outwardly from the wall, the tie member will be frequently at an angle and the clip must be capable of resisting the twisting placed on it.

The clip is formed with at least two openings 23 and 24 on either side of the U-shaped portion for receiving fasteners such as threaded screws 22 or rivets.

The B-shaped tie down member is preferably formed from steel wire having a circular cross section so that it can pivot freely within the clip and will not present any sharp edges which would cut or damage the rope or belting used as the tie member. As an example, the wire may be ¼ inch alloy steel, heat treated and plated for extra strength and resistance to corrosion.

Since the device is normally contained within a circle; as for example a diameter of 3.500 inches, the wire is formed in a roughly B-shape. This unique shape permits the device to serve as a closed ring when portions 13 and 14 are welded together as by weld 18 and it also permits the device to serve as a post to which a loop 26 in the tie member 27 may be attached.

The connected portions 13 and 14 of the B-shaped tie down member preferably have a relatively straight portion of a length at least equal to the diameter of the cargo tie member 27. Thus, the tie member 27 can loop around the tie down member post and have some latitude for sliding movement without being pinched between the splayed ends 19 and 20 and the small curvature radius 28 and 29.

In order to retain the loop 26 of the tie member 27, the ends 16 and 17 are splayed apart and have a displaced distance one from the other of approximately the distance of an end from the outermost radial distance of the first and second curved portions. The splayed ends are bent at roughly a 30 to 40° angle with the straight portions 13 and 14. As an example, where the long axis of the B-shaped tie down member is about 3.0 inches, the distance between the ends 16 and 17 is roughly 1 inch and there is about three-fourths inch clear distance between the ends and the curved portions 8 and 9.

Where there are problems of outside dust entering the cargo space due to the opening 31 formed in the sidewall 1 of the cargo container, a dust cover or backing plate 32 having a planar sheet portion is connected to the hold-down clip as by welding so that it contains the straight portion 7 of the B-shaped tie down member for pivotal movement. Use of the dust cover holds the clip and the B-shaped tie member together so that the anchoring device may be more easily connected to the structural members 2.

To install a typical dual cargo anchoring device a 3½ inch diameter hole is cut in the plywood liner. Next, the entire assembly is placed in the cutout and fastened to the structural member through the center opening 24. The last step is to drill through top hole 23 in the clip through the backplate into the structural member and fasten in place with screw 22 or a rivet.

In operation, several anchoring devices are placed in a single cargo container so that portions of the load can be tied down. Also, as in delivery trucks where portions of the load are unloaded and the remainder must be retied, it is desirable to have the devices located every few feet or less as conditions require. Preferably, the devices are located on both sides of the container at approximately opposite locations.

In one use of the device, a cargo tie member such as a rope, strap or heavy cord is threaded through the B-shaped tie down member with the tie member passing through either curved portion at radius 28 or 29, or threaded around the tie down member twice and passing through both radius portions 28 and 29. Threading the tie member through the B-shaped tie down member may be desirable where there is a real possibility that the tie member will go completely slack due to the type of the load or the terrain being traveled.

Figure 5:
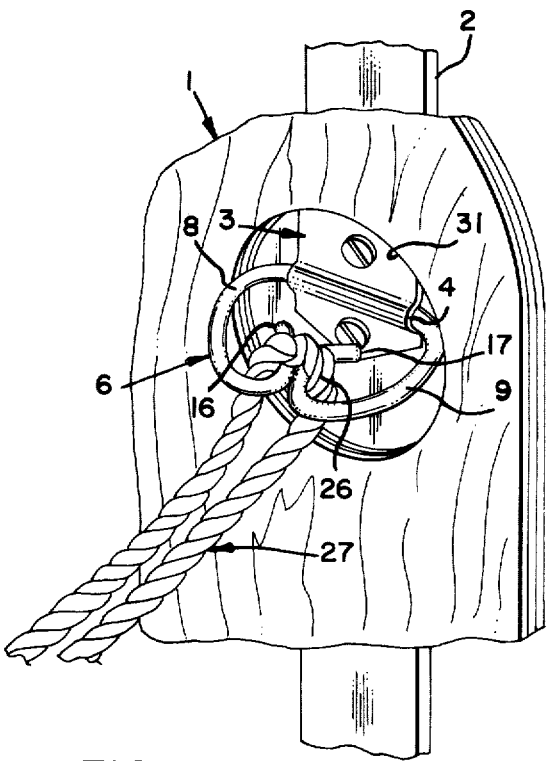
FIG. 5 is a perspective view of the device as installed with a load binding element attached to the post portion of the device.

In many instances, it will only be necessary to loop the tie member about the post as shown in FIG. 5. By placing tie member 27 on the underside of the B-shaped member, the weight of the tie member and the fact that the B-shaped member is pivoted about its straight side 7, there is less chance for the tie member to separate from the post. As previously explained, the splaying of ends 16 and 17 further deters the tie member loop 26 from separating from the post.

Since the B-shaped member is pivoted, the force of the tie member is transferred in a straight line to the U-shaped portion of the clip member directly. There is less application of the load on a lever arm which would tend to bend and distort the B-shaped member and the U-shaped portion of the clip.

As may be seen by studying FIG. 5, it is of no consequence whether the tie member is pulling downwardly or upwardly. The special shape of the tie down member 6 prevents the loop 26 from slipping off the post.

I claim:

1. A dual cargo anchoring device for a cargo vehicle having sidewalls and frame members comprising:
   a. a hold-down clip having an elongated U-shaped portion and adapted for connection to said frame members of said vehicle;
   b. a B-shaped tie down member having:
      1. a straight portion for pivotal support between said U-shaped portion of said clip and said frame member,
      2. first and second curved portions integrally connected to opposite ends of said straight portions and curving inwardly with the portions adjacent the ends being connected as by welding,
      3. first and second end portions integrally connected to said first and second curved portions splaying away from each other and;
   c. means for attaching said clip to said frame members.

2. A dual cargo anchoring device as described in claim 1 for anchoring an elongated cargo tie member comprising:
   a. said connected portions of said B-shaped tie down member having a relatively straight portion of a length at least equal to the diameter of said cargo tie member.

3. A dual cargo anchoring device as described in claim 2 comprising:
   a. said first and second ends extending a distance beyond said edge of said connected portion a distance at least equal to the diameter of said cargo tie member.

4. A dual cargo anchoring device as described in claim 2 comprising:
   a. said ends of said B-shaped tie down member having a displaced distance one from the other of approximately the distance of an end from the outermost radial distance of the first and second curved portions.

5. A dual cargo anchoring device as described in claim 1 comprising:
   a. a dust cover having a planar sheet portion connected to said hold-down clip and containing said B-shaped tie down member for pivotal movement.

* * * * *